United States Patent Office 3,504,030
Patented Mar. 31, 1970

---

3,504,030
AMINO BICYCLO[6.1.0]NONANES
Berthold Richard Vogt, King of Prussia, Pa., assignor to Smith Kline & French Laboratories, Philadelphia, Pa., a corporation of Pennsylvania
No Drawing. Filed Mar. 10, 1967, Ser. No. 622,075
Int. Cl. C07c *85/00, 87/00*
U.S. Cl. 260—563        8 Claims

---

ABSTRACT OF THE DISCLOSURE

Bicyclo[6.1.0]nonanes, substituted at the 9-position with an amino, aminomethyl, or α-aminoethyl group, are prepared from the 9-carboxylic acid. The compounds are active against influenza infections.

---

This invention relates to amino bicyclononanes having antiviral activity. In particular, the invention relates to bicyclo[6.1.0]nonane compounds, substitnted at the 9-position with an amino, aminomethyl, or aminoethyl group.

The compounds of the invention are represented by the following structural formula:

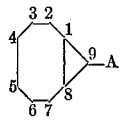

wherein

A is NHR, CH₂NHR, or

R is hydrogen or methyl.

Also considered part of the present invention are the pharmaceutically acceptable acid addition salts of the compounds of Formula I. Among the preferred salts are the hydrochloride, sulfate, hydrobromide, maleate, citrate, tartrate, and fumarate.

The compounds of the invention are prepared from bicyclo[6.1.0]nonane-9-carboxylic acid (II), which is disclosed in the J. Amer. Chem. Soc. 77:2476 (1955) and is prepared by reaction of cyclooctene with ethyl diazoacetate and saponification of the ester function.

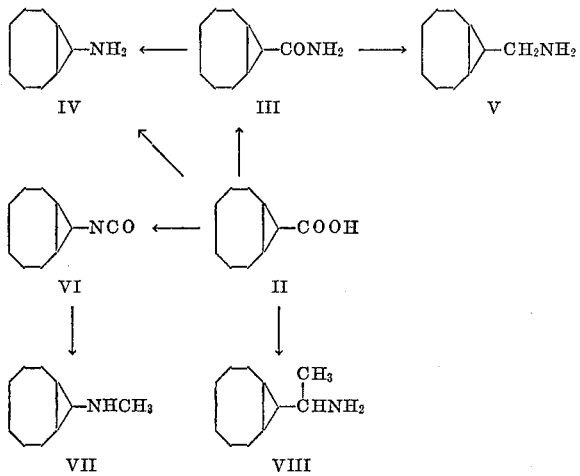

The carboxylic acid is converted to its amide by reaction with a reagent such as thionyl chloride and amination of the resulting acid chloride. The amide III is subjected to the Hofmann Rearrangement to give the amine IV. Alternatively, the acid II may be directly converted to the amine IV by means of the Schmidt Reaction using sodium azide and sulfuric acid. Reduction of the amide III with a reagent such as lithium aluminum hydride gives the methylamine V. The carboxylic acid II may be converted to the isocyanate by conversion to the acid chloride and then to the azide, and then refluxing the azide for about two hours in benzene. The isocyanate may then be hydrolyzed with an acid such as concentrated hydrochloric to give the amine IV or it may be treated with methanol and the resulting carbamate reduced to the N-methylamine with lithium aluminum hydride. Reaction of the carboxylic acid II with methyl lithium gives a metal ketone which is converted to its oxime and then reduced with lithium aluminum hydride to give the α-methylmethylamine VIII. Any of the product primary amines of the invention (IV, V, VIII) may be methylated or otherwise alkylated by treatment with a halide or sulfate. Methyl iodide is the preferred reagent. Any of the amine products may be combined with a pharmaceutically acceptable acid, either or both of the reactants being in an ethreal, alcoholic, or acetone solution, in order to obtain a salt.

The product compounds of the present invention possess antiviral activity, particularly against influenza infections. The preferred compound of the invention bicyclo[6.1.0]none-9-amine (IV) has been found to increase the percent survival of mice infected with influenza A₂, Ann Arbor strain and influenza A₁, swine strain by 35–75% when administered orally and subcutaneously at dosages of 25 mg./kg. The compounds, prefreably in the form of their salts, are formulated conventionally into capsules, tablets, and injectables, using standard pharmaceutical excipients, and administered in doses which vary according to the weight and nature of the subject being treated and the severity of the infection.

Various morifications which are obvious in the light of the present disclosure may be made in the compounds of the invention and in the methods for their preparation. They are intended to be part of the present invention.

The following examples are intended to illustrate the preparation of the compounds of the invention, but are not to be construed as limiting the scope thereof. The temperatures stated are in degrees centigrade.

EXAMPLE 1

Bicyclo[6.1.0]nonane-9-carboxamide

A mixture of 9.8 g. (0.06 mole) of bicyclo[6.1.0]-nonane-9-carboxylic acid, 50 ml. of ether, 12.5 ml. (20.2 g.) of COCl₂, and a trace of pyridine is refluxed for one and one-half hours, and allowed to cool. The solution containing the acid chloride is then poured slowly into a cooled 60 ml. portion of concentrated NH₄OH. Water (ca. 100 ml.) is added and the amide collected and dried.

EXAMPLE 2

Bicyclo[6.1.0]nonane-9-amine

To a solution of 0.46 g. (0.02 mole) of Na in 50 ml. of methanol is added 1.67 g. (0.01 mole) of the above amide suspended in 20 ml. of methanol. After solution is achieved, 1.6 g. (0.01 mole) of Br₂ is added to the stirred solution, the mixture is then refluxed on the steam bath for 15 minutes, and then allowed to cool to room temperature. Acetic acid is added to pH 6, and the methanol evaporated until a thick slurry is obtained. Water (50–75) ml.) is added, followed by petroleum ether, and the petroleum ether layer is then separated and evaporated. To the resulting residue is added 20 ml. of methanol, 5 ml. of water, and 5 g. of KOH, and the mixture then refluxed for 22 hours. The solution is cooled, 10 ml. of water is added, and the solution extracted with ether. Evaporation of the ether gives the title product.

A hydrochloride salt is prepared by adding ethereal HCl to an ether solution of the basic product. The resulting solid is collected and recrystallized from methanol-acetonitrile and melts at 249°.

EXAMPLE 3

Bicyclo[6.1.0]nonane-9-methylamine

To a solution of 7.0 g. (0.042 mole) of the amide of Example 1 in 400 ml. of dry tetrahydrofuran and 50 ml. of ether is added slowly 6.4 g. (0.168 moles) of LiAlH₄. The mixture is refluxed for 48 hours, cooled, and saturated Na₂SO₄ solution carefully added. The mixture is filtered, and the filtrate dried and evaporated to give the title product.

A hydrochloride salt is prepared by dissolving the basic product in ether and adding ethereal HCl. The crude salt is dissolved in methanol and refluxed with Norite for two hours. The mixture is filtered, the methanol evaporated and the residue recrystallized from isopropanol-ether and isopropanol-acetonitrile; M.P. 254–254.5°.

EXAMPLE 4

α-Methylbicyclo[6.1.0]nonane-9-methylamine

Bicyclo[6.1.0]nonane-9-carboxylic acid (4.95 g., 0.0295 mole) is dissolved in 100 ml. of dry tetrahydrofuran and, with stirring under nitrogen, 31 ml. (0.062 mole) of 2 N methyl lithium in ether is added over three to four minutes. The mixture is refluxed overnight and cooled to room temperature. Water (25 ml.) is added, and the product extracted with ether. The ether is dried and evaporated to yield bicyclo[6.1.0]non-9-yl methyl ketone.

To a mixture of 5.80 g. of this ketone, 3.22 g. (0.0463 mole) of hydroxylamine hydrochloride, and 15 ml. of ethanol are added, portionwise with stirring, 3 ml. of water and 5.9 g. (0.147 mole) of powdered NaOH. The reaction mixture is stirred and refluxed for five minutes, cooled, diluted with water, neutralized with 3 N HCl and extracted with ether. The ether is dried and evaporated to yield the oxime of the ketone.

A solution of 3.84 g. of the oxime in 50 ml. of tetrahydrofuran is added to a stirred suspension of 2.93 g. (0.077 mole) of LiAlH₄ in 75 ml. of ether. The mixture is stirred and refluxed overnight, cooled to room temperature, and 7 ml. of water is added dropwise. After stirring for an hour, the mixture is filtered, and the filtrate dried and evaporated to the title product. A salt is prepared in the customary manner.

EXAMPLE 5

Bicyclo[6.1.0]nonane-9-amine

Bicyclo[6.1.0]nonane-9-carboxylic acid (0.8 g.) is allowed to stand overnight in SOCl₂ (10 ml.). The excess SOCl₂ is removed by heating in vacuo to give the crude acid chloride.

The acid chloride is dissolved in acetone (40 ml.), the solution cooled to 3°, and then a solution of NaN₃ (0.5 g.) in 5 ml. of water added in one portion. After stirring at 0–5° for 30 minutes, the mixture is diluted with water (70 ml.), extracted with benzene, and the combined extracts are dried over anhydrous MgSO₄.

The benzene solution of the azide is heated at reflux for two hours and then evaporated in vacuo to give the isocyanate.

The isocyanate is dissolved in tetrahydrofuran (30 ml.), concentrated HCl added, the solution heated at reflux for one hour, and then allowed to stand overnight at room temperature. The tetrahydrofuran is removed in vacuo, the residual solution diluted with water (30 ml.) and 3 ml. of dilute HCl. After extraction with ether, the aqueous layer is basified with 10% aqueous NaOH solution and then extracted with ether. The ether extracts are dried and evaporated to give the title amine.

EXAMPLE 6

N-methylbicyclo[6.1.0]nonane-9-amine

Bicyclo[6.1.0]nonane-9-isocyanate (3.3 g., .02 moles) is dissolved in 60 ml. of methanol and the solution is then refluxed for two hours. The solvent is evaporated in vacuo, 50 ml. of dry tetrahydrofuran is added to the resulting carbamate, and the mixture is refluxed with 0.76 g. of LiAlH₄ for four hours. The reaction mixture is decomposed with water and filtered, and the filtrate evaporated to give the title product.

EXAMPLE 7

N-methylbicyclo[6.1.0]nonane-9-methylamine

To a stirred solution of 125 ml. of absolute alcohol, 12.5 g. of NaHCO₃, and 8.8 g. of bicyclo[6.1.0.]nonane-9-methylamine hydrochloride is added 7.1 g. of methyl iodide. The mixture is warmed and maintained at a temperature sufficient to cause the evolution of carbon dioxide until the gas evolution ceases. The mixture is cooled and filtered, and the solvent evaporated. Ten percent NaOH is added to the residue, and the basic mixture extracted with ether. The ether extracts are dried and evoporated to give an oil which is distilled to give the title product.

Treatment of the other primary amines of this invention with methyl iodide in the same manner gives the corresponding N-methyl secondary amine products.

I claim:

1. A compound of the formula:

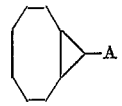

or a pharmaceutically acceptable acid addition salt thereof, wherein
   A is NHR, CH₂NHR, or

R is hydrogen or methyl.

2. A compound as claimed in claim 1, where R is hydrogen.

3. A compound as claimed in claim 2, being the compound bicyclo [6.1.0]nonane-9-amine.

4. A compound as claimed in claim 3, being the hydrochloride salt of the compound bicyclo[6.1.0]nonane-9-amine.

5. A compound as claimed in claim 2, being the compound bicyclo[6.1.0.]nonane-9-methylamine.

6. A compound as claimed in claim 5, being the hydrochloride salt of the compound bicyclo[6.1.0]nonane-9-methylamine.

7. A compound as claimed in claim 2, being the compound α-methylbicyclo[6.1.0]nonane-9-methylamine.

8. A compound as claimed in claim 1, being the compound N-methylbicyclo[6.1.0]nonane-9-amine.

References Cited

UNITED STATES PATENTS 3,258,469   6/1966   Blanchard et al. __ 260—563 X

ROBERT V. HINES, Primary Examiner

U.S. Cl. X.R.

260—453, 468, 501.1, 514, 544, 557, 566, 586, 999